UNITED STATES PATENT OFFICE.

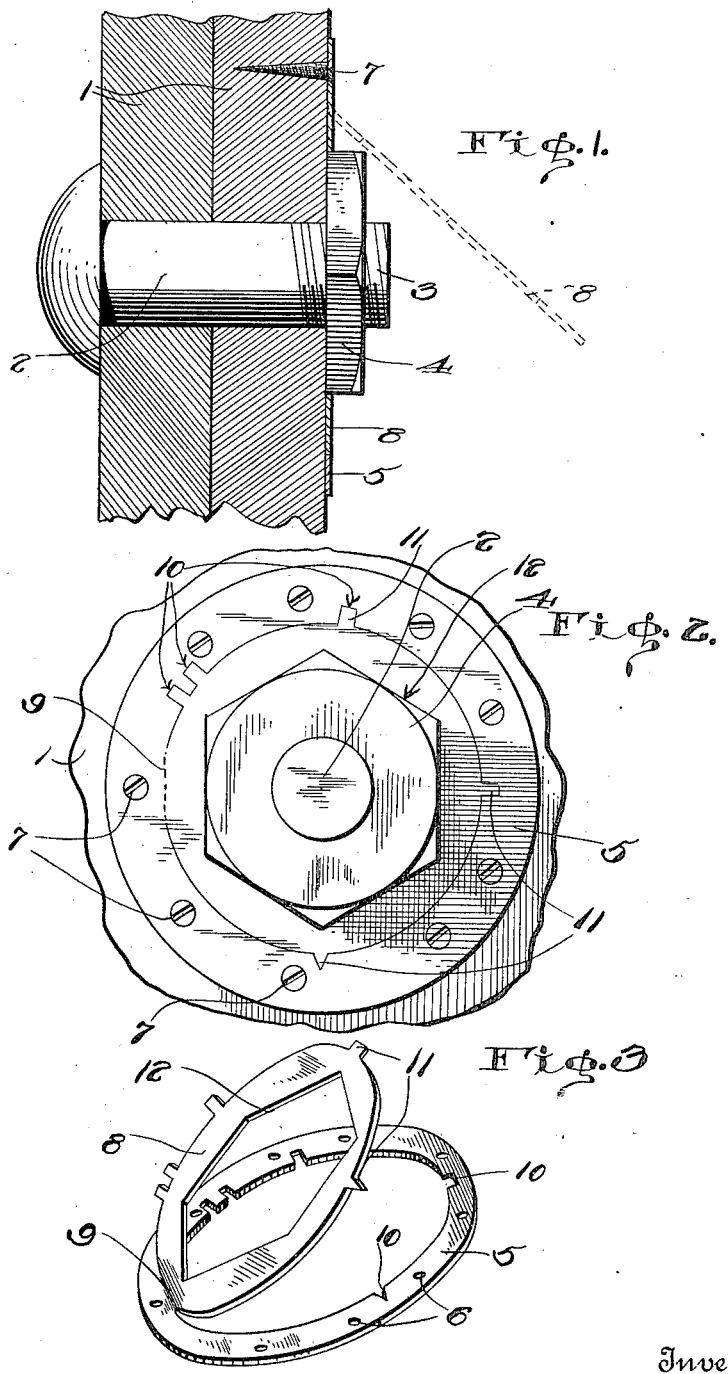

FRED ROWE, OF JOPLIN, MISSOURI.

NUT-LOCK.

1,090,943. Specification of Letters Patent. Patented Mar. 24, 1914.

Application filed August 23, 1913. Serial No. 786,322.

*To all whom it may concern:*

Be it known that I, FRED ROWE, a citizen of the United States, residing at Joplin, in the county of Jasper and State of Missouri, have invented certain new and useful Improvements in Nut-Locks, of which the following is a specification, reference being had therein to the accompanying drawing.

This invention relates to a nut lock and has for its object the production of a simple and efficient means for holding the nut against rotation upon the bolt after the same has been placed thereon.

Another object of the invention is the production of a plurality of plates which are adapted to lock the nut upon the bolt for preventing the nut from rotating so as to become loose upon the bolt.

With these and other objects in view this invention consists of certain novel combinations, constructions and arrangements of parts as will be hereinafter fully described and claimed.

In the accompanying drawing: Figure 1 is a sectional view taken through a plurality of supports showing the device carried thereby, a portion of the invention being shown in section. Fig. 2 is a front elevation of the invention. Fig. 3 is a perspective view of the anchoring plate and locking plate.

Referring to the accompanying drawing by numerals, 1 indicates the supports which are adapted to carry the bolt 2, this bolt 2 being provided with the usual threaded end 3. A nut 4 is positioned upon the threaded end 2 for holding this bolt in engagement with the supports 1. In order to hold this nut 4 upon the bolt and prevent the same from rotating so as to become lost, there are provided a pair of plates. An anchoring plate 5 having a plurality of apertures 6 is held in engagement with the supports by means of the ordinary screws 7 passing through the apertures 6. The locking plate 8 is stamped from the central portion of the anchoring plate 5 and is hingedly secured to the locking plate 5 by means of the integral portion 9. The anchoring plate is provided with a plurality of notches 10 in which the lugs 11 formed upon the outer periphery of the locking plate, are adapted to fit. Since the anchoring plate 5 is fixedly secured upon the supports 1 by means of the screws 7, when the lugs 11 are positioned within the notches 10 the locking plate 8 will be held against rotation. This locking plate 8 is provided with a central opening 12 which is adapted to allow the nut 4 to fit within the locking plate 8.

When this device is used the nut and bolt may be placed upon the support in the ordinary manner. The anchoring plate 5 may then be placed about the nut and since the locking plate extends outwardly, as indicated in dotted lines in Fig. 1, this locking plate will not interfere with the securing of the anchoring plate 5 upon the support. After this anchoring plate 5 has been secured to the support, the locking plate 8 may be moved so as to allow the nut 4 to pass through the opening 12, at which time the lugs 11 will rest within the notches 10. In this manner the nut will be held securely upon the bolt against rotation, but whenever it is desired to remove the nut by simply swinging the locking plate 8 upon the integral portion 9, the locking plate may be moved from engagement with the nut at which time the nut may be removed from engagement with the bolt.

From the foregoing description it will be seen that a simple and efficient nut lock has been produced which will efficiently hold the nut upon the bolt, but which may be efficiently removed when it is desired to remove the nut.

Having thus described the invention, what is claimed, is:—

A nut lock comprising an anchoring plate adapted to be secured to a support, a locking plate stamped from the inner portion of said anchoring plate, said plates provided with an integral portion for hingedly securing said locking plate to said anchoring plate, said locking plate provided with a central opening adapted to fit over a nut for holding the same against rotation, said locking plate provided with a plurality of lugs upon its outer periphery, said anchoring plate provided with a plurality of notches upon its inner periphery, said lugs adapted to fit in said notches for holding said locking plate against rotation.

In testimony whereof I hereunto affix my signature in presence of two witnesses.

FRED ROWE.

Witnesses:
C. F. BOLDMAN,
W. O. CUSTER.

Copies of this patent may be obtained for five cents each, by addressing the "Commissioner of Patents, Washington, D. C."